United States Patent [19]
Gamble

[11] 3,835,700
[45] Sept. 17, 1974

[54] FUEL METER

[75] Inventor: Peter Dennis Gamble, Mickleover, England

[73] Assignee: The Lubrizol Corporation, Wickliffe, Ohio

[22] Filed: June 28, 1973

[21] Appl. No.: 374,374

[30] Foreign Application Priority Data
July 12, 1972 Great Britain.................... 32627/72

[52] U.S. Cl. ................................................ 73/113
[51] Int. Cl. ............................................ G01f 1/04
[58] Field of Search ............. 73/113, 291, 301, 223

[56] References Cited
UNITED STATES PATENTS
2,764,645  9/1956  Smith................................ 73/301 X
2,841,011  7/1958  Mayes et al....................... 73/301 X Primary Examiner—Jerry W. Myracle
Attorney, Agent, or Firm—Donnelly, Maky, Renner & Otto

[57] ABSTRACT

A meter for fuel or other liquid using an upstanding precision bore for containing the liquid and a pressure transducer disposed in the lower part of the tube to generate electrical signals dependent on the liquid level of the same. A control system and trip means registers the time elapsing as liquid is withdrawn from the tube between two selected liquid levels, to cause the tube to be refilled at a further level and to disable the meter and actuate an alarm at a fourth level signal. An electronic differentiator provides rate of change signals from the pressure dependent signals for logging, indication and the like, and the output of the differentiator can be held at a selected level signal for the refilling of the tube.

9 Claims, 4 Drawing Figures $P = qgh$ $W = qAh$

FUEL METER

This invention relates to a liquid fuel meter, and particularly although not exclusively to a meter for attachment to an engine under test to give an indication of the rate of fuel consumption.

Various proposals have been made for continuously reading meters particularly for use with engines or lubricants under test, based on turbine-type or other rotating-vane type of fluid flowmeters, but none of these have proved entirely satisfactory in practice. Among the problems encountered has been the fluctuations induced by ambient temperature variations. These raise particular difficulties if the meter is a type which measures fuel volume.

Weight of fuel consumed has been proposed as the basis of one design of meter, in which the fuel was stored in a precision-bore upstanding tube. Changes in the hydrostatic head were registered and fed to a computer each time a reading was to be taken of the particular engine concerned. (See "Automated Engine Testing of Motor Oils" by Shields, Hening and Bourne, Soc. of Automotive Engineers, Inc. October 1969). This proposal, however, does not provide a continuous readout of the rate of fuel consumed.

According to the present invention, there is provided a liquid meter comprising an upstanding high tolerance bore tube for containing the liquid, a pressure transducer disposed in a lower region of the tube and constructed to give a signal dependent on the liquid level in the tube, a trip device responsive to the signal level and constructed to trip at not less than two signal levels, and a control system associated with the trip device, the control system being operable to register the time elapsing as liquid is withdrawn from the tube between tripping at a first and a second signal level and operable to cause the tube to be refilled with liquid.

A preferred form of liquid meter includes a trip device responsive to signal level from the transducer and constructed to trip at not less than three signal levels. In this version of the invention the control system is operable to register the time elapsing (as liquid is withdrawn from the tube) between tripping at a second and a third signal level, and the control system operates to cause the tube to be refilled with liquid to a liquid level that corresponds to a first signal level, the latter corresponding to a greater weight of liquid in the tube than the second or the third signal level.

In a preferred embodiment of this version of the invention, the refilling of the tube is initiated by the tripping at the third signal level.

In a more preferred embodiment, the trip device is such as to trip at a fourth signal level corresponding to a smaller quantity of liquid in the tube than the first, second, or third signal levels. The tripping of the trip device at the fourth signal level may be used to shut the whole meter down and to actuate an alarm.

The control system may be electrical-electronic, and in this case the trip device will be a four-signal-level trip amplifier. Alternatively, a fluidics type of system may be used.

The second signal level signal from the trip amplifier may be used to start a time counter circuit, and the third signal level to stop it.

In a particular embodiment of the invention the pressure dependent signal from the transducer is fed to an electronic differentiator to give a rate of change signal. This signal is representative of a rate of liquid (fuel) consumption expressed as weight per unit time, and the output from the differentiator is a continuous voltage varying in accordance with the rate of loss of weight from the column of liquid and as such it can be used for data logging, direct presentation on a dial meter, or for feeding a recorder or any other suitable indicator. With this embodiment of the invention, the signal at the third trip level can be arranged to ensure that the output of the differentiator circuit is held at the signal level reached, until the tube is refilled with liquid and the second trip level is reached. In this way, the rate indication reading can be held at the rate occurring during the timed consumption of fuel, and then its new value picked up once stable conditions have once again been reached following refilling of the tube.

As a refinement of the invention, it would be possible to use twin tubes, whereby one tube is refilled while the other is emptying. In this way, virtually unbroken continuous operation could be achieved.

The time counter may be mains operated or operated by any other suitable source of a time reference.

In this Specification including its claims, by "high precision tube" is meant a tube whose internal cross-sectional area is uniform with length, that is to say the internal cross-sectional area varies by less than a ¼ percent from one point to another along the length of the tube.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
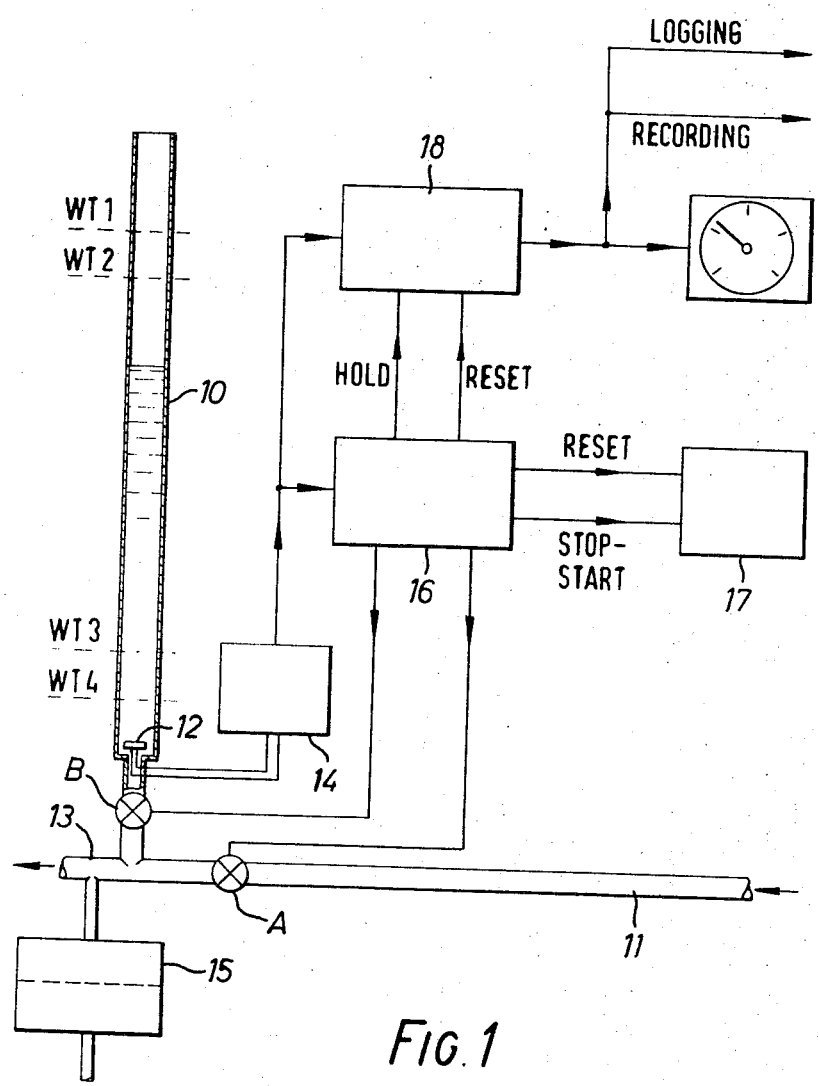
FIG. 1 is a general view of one form of liquid fuel meter in accordance with the present invention.

Referring to the drawings now more in detail, the meter illustrated in FIG. 1 includes an upstanding tube 10 having a precision bore, having a pressure transducer 12 in a lower region. The tube 10 is open at the top and its bottom end is closed by a solenoid-operated valve B connecting the tube into a fuel line 11 from a header tank (not shown). A solenoid valve A is disposed in this fuel line. From the bottom of the tube 10, in normal operation, fuel is fed to an engine under test via a pipe 13, with a capacity smoothing device 15 or other damping device being included in a branch off this pipe 13, in order to remove unwanted pressure pulses from the liquid being fed to the engine. The capacity smoothing device 15 may be formed by a chamber partly bounded by a flexible diaphragm whose other side is open to ambient atmosphere.

The pressure transducer 12 feeds its output signal to a transmitter 14 whence the signal passes to a four set point trip circuit 16 and a differentiator and hold circuit 18. Further details of items 16 and 18 are given in FIG. 4 respectively.

The four set points of the trip circuit correspond to four separate weights on the upstanding tube 10, and are representative of fuel weights WT1, WT2, WT3 and WT4 in the tube. Because the transducer 12 measures pressure, fluctuations of the volume of fuel in the tube 10 with temperature can be ignored. The basic idea is that the circuitry will measure the time elapsing between when the fuel is at a liquid level corresponding to weight WT2 and weight WT3.

Figure 2:
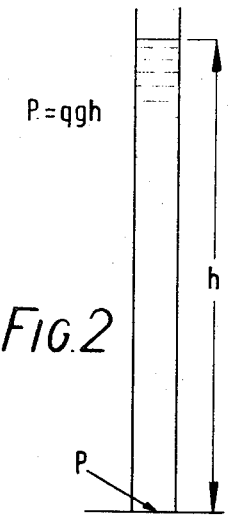
FIGS. 2 and 3 illustrate the principle of the system.
Figure 3:
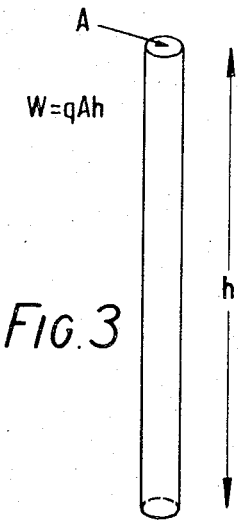

Referring for the moment to FIGS. 2 and 3, the pressure at the transducer equals $q g h$ where $g$ is the acceleration due to gravity, $h$ is the height of the liquid, and $q$ is its density. The weight of fuel $W$ equals $qAh$, where $A$ is the cross sectional area of the tube. With a high tolerance bore tube, made of appropriate material, the variation in $A$ with temperature variation is of a very small order in magnitude compared to any variation in $q$ with temperature. Temperature variations may be of particular importance since continuous monitoring of fuel consumption may be required on a 24 hour basis, and it is usually not practical to operate with artificially induced constant temperature conditions to equalize out temperature variations over 24 hours.

From the two equations, one sees that the weight of fuel in the tube, $$W = pA/g$$

thus by taking care to limit any change of $A$ with temperature by using suitable material for the tube, a very accurate reading can be obtained without resorting to complex or expensive equipment.

Figure 4:
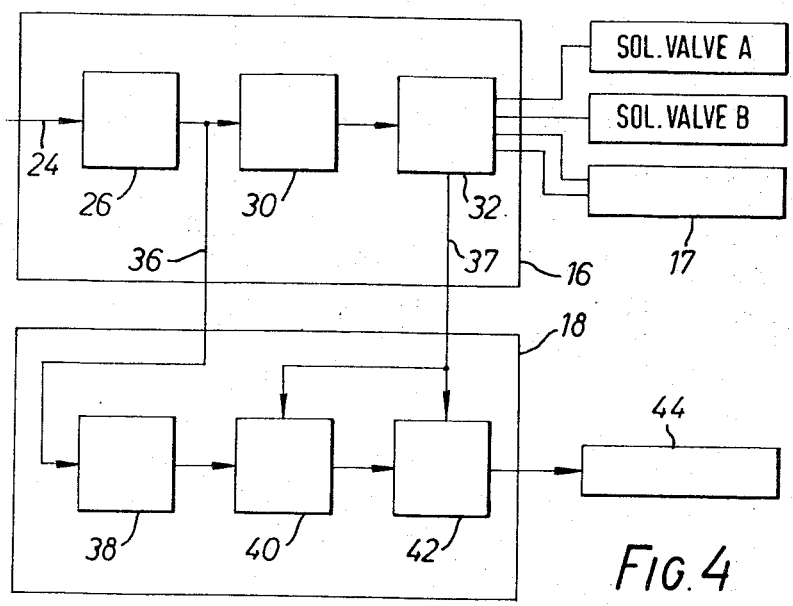
FIG. 4 is a block diagram of one form of circuit usable in a liquid meter according to the invention.

FIG. 4 is a circuit diagram in block form of an illustrative four set point trip circuit 16 and the differentiating and hold circuit 18. The signal from the transducer 12 is fed in on line 24. A filter 26 is included to limit the effect of fluctuations in fuel liquid level such as may occur due to vibration.

The four point trip circuit 16 (see FIG. 4) is arranged to receive a voltage signal from the transducer 12 via the transmitter 14 and a filter 26 whose function is to reduce the fluctuations in absolute magnitude of the signal from the transmitter 14 to a sufficiently small level to allow the required degree of accuracy at a level detection unit 30. Removal of noise at this point is desirable because of the linear action of voltage level detection amplifiers in the unit 30 used to determine the achievement of the selected voltage and therefore weight levels.

The trip circuit 16 may include in the level detection unit 30 four (for example) high gain amplifiers comparing the input signal with four reference voltages.

Alternatively the trip circuit 16 may include a Schmidt trigger circuit for each signal level, which circuit switches to a second condition immediately the desired signal level is reached, and remains set in that condition irrespective of slight signal fluctuations of the input signal. Slight signal level fluctuations, for example those induced by vibration, if a conventional high gain amplifier only is used as a comparator, may result in undesired switching of the following logic circuit 32.

The output of the level detection unit 30 is used to condition a logic circuit 32 which in turn operates the solenoid valves A and B, a time counter 17, and a differentiator and hold circuit 18. The logic circuit is not described in greater detail since the general principles of such circuits are well known to those skilled in the art and the skilled man will readily assemble a suitable logic circuit 32.

A signal 36 derived from the output of the filter 26, is fed to a second filter circuit 38 which may be active or passive and whose specific function is to allow through to a differentiator circuit 40 a signal from which a significant proportion of the noise is removed. The differentiator being a circuit which is sensitive basically to rate of change of input, the filter is arranged to reduce particularly those components of the input wave form which constitute a high rate of change by comparison with the rates of change for which the unit is designed to operate.

The differentiator is basically a high gain amplifier arranged as is usual with Operational Amplifiers to give a voltage output proportional to the rate of change of the input voltage. It may have a limited duty filter (not shown) attached to its output to prevent spurious signals from reaching the holding circuit 42 and succeeding indicator 44. The differentiator 40 gives an output signal which is representative of the rate of change of fuel weight with time, and, except when intercepted by the holding circuit 42, this signal is directly displayed by the indicator 44.

The differentiator 40 may be recycled during the refill time, reset or left to provide such an output as its input determines. The holding circuit 42 is however specifically designed to store the rate of change signal for remote indication during the refill or other waiting period and it operates through the use of one or more storage capacitors arranged to follow the voltage output of the differentiator circuit during the emptying cycle or arranged to be charged to a level proportional to such a voltage at the end of the empty cycle or, as convenient, just before the end of the empty cycle.

The holding circuit 42 may have a long or short duration which will be arranged to suit the application of the liquid meter, or its mode of use. For a recycling system the hold duration need be little longer than the refill time. For a single cycle type of operation which may be convenient for certain purposes, the duration of hold without the output signal suffering sensible deviation from the true value at the start of the hold period may be ½ an hour or longer as convenient. A limitation of 1 week is put upon this duration.

The holding circuit 42 may be of a sampling or continuous type but will essentially include the use of a device or devices whose resistance to the passage of current can be varied from a high to a low state. As examples, a reel relay, and transistors, particularly field effect transistors, may be used. Similar devices may be used in the differentiator.

One of the features of the circuits 40 and 42 is the use of a high resistance condition, for example by using a field effect transistor whose resistance may be altered from a low to a high value, to effectively break the connection of the holding circuit 42 to the differentiator 40.

The output signal of the holding circuit 42 may be power amplified for remote indication or any other purpose.

Mode selection circuits (not shown) may be provided to enable the action of all or part of the circuitry to be controlled. For example one mode is continuous operation whilst another is a "single shot" arranged to give one reading only.

This selection is achieved by a given setting of the logic circuit 32 which broadly determines the operation of the solenoid valves A and B and the time counter 17. The logic circuit feeds the signals along line 37 to shut off the operation of differentiator 40 except between the desired liquid levels, in particular except when the liquid level is between the second and third liquid weight levels as seen in FIG. 1.

A fail safe element is included in the design and one of the features of the design is the facility for returning the equipment to a condition (solenoid valve A open, solenoid valve B shut) which passes fuel through to the engine in the event that the external electrical supply to the unit fails or is removed by some means. In this way, the system automatically reverts to a condition wherein the liquid fuel supply is not interrupted should the electrical power supply fail to the circuitry of FIG. 4 or should any part of the control unit fail. In other applications of the invention, where continuous engine testing is not involved, it may be desirable to arrange the fail safe facilities differently, so that a failure of electrical power supply or an operational failure in the circuits shut down the engine.

The differentiator, in an alternative version of the invention may use the known process of implicit differentiation by integration and approximation which is commonly used in digital calculators or computers.

In a further alternative, the differentiator may use the voltage change observed at the transmitter output during a specific and much repeated short time interval to provide an output proportional to the rate of change required; and in yet another alternative may determine the time taken for such a voltage to change by a predetermined amount.

The essence of these three alternatives is that the time interval or voltage change will be small compared to the full cycle time. The results of each individual sampling may be fed in series to the output indicator 44 and holding circuit 42, or examined statistically to remove spurious information before being passed to the holding circuit, or filtered before being passed to the holding circuit 42.

The invention may be utilized to give flow rate indications other than rate of flow of fuel to an engine. For example, the apparatus described herein can be used to monitor the flow rate of a reagent fed to a chemical process, and the invention has the advantage over systems where the weight of a tank of liquid is continuously measured by load cells that the present invention does not require stringent freedom from all mechanical vibrations and careful shielding from air currents in order to achieve high accuracy.

I, therefore, particularly point out and distinctly claim as my invention:

1. A liquid meter comprising an upstanding precision bore tube for containing the liquid, a pressure transducer disposed in a lower region of the tube and constructed to give a signal dependent on the liquid level in the tube, trip means responsive to such level signal and constructed to trip at not less than two trip levels, and a control system associated with the trip means, the control system being operable to register the time elapsing as liquid is withdrawn from the tube between tripping at one and another of the said two trip levels.

2. A liquid meter according to claim 1 in which the trip means includes a first trip level representative of a greater weight of liquid in the tube than the said two trip levels, the latter being respectively termed the second and third trip levels, with refilling of the tube with the liquid being initiated by the tripping at the third trip level.

3. A liquid meter according to claim 2 in which the trip means is constructed to trip at a fourth trip level corresponding to a smaller quantity of liquid in the tube than the first, second, or third trip levels, and in which an alarm device is included, connected so that the tripping of the trip means at the fourth level signal is used to shut the meter down and to actuate the alarm device.

4. A liquid meter according to claim 3 in which a differentiating circuit is included whose output is fed to indicator means to give a direct display of fuel consumption rate.

5. A liquid meter according to claim 2 in which the control system includes a time counter circuit and the second trip level signal starts the operation of the time counter circuit and the third trip level signal stops it.

6. A liquid meter according to claim 2 in which the signal at the third trip level is arranged to hold the output of the differentiator circuit at the level signal reached at the third trip level until the second trip level is reached by refilling.

7. The combination comprising a fuel supply system for an engine and a liquid meter, the liquid meter comprising an upstanding precision bore tube for containing the liquid, a pressure transducer disposed in a lower region of the tube and constructed to give a signal dependent of the liquid level in the tube, trip means responsive to the level signal constructed to trip at not less than two trip levels, and a control system associated with the trip device, the control system being operable to register the time elapsing as liquid is withdrawn from the tube between tripping at one and another of the said two trip levels, and the fuel supply system comprising a first tube for supplying fuel from a supply tank via first valve means to a second tube, the latter being adapted for connection to an engine, and a branch tube off the second tube and connected via second valve means to the high precision bore tube.

8. The combination according to claim 7 including a branch tube off the second tube and, connected to the branch tube, a capacity smoothing device for smoothing out unwanted pressure pulses in the fluid being fed to the engine.

9. The combination according to claim 8 in which the capacity smoothing device is formed by a chamber open to the fuel and partly bounded by a resilient diaphragm whose other side is open to ambient atmosphere.

* * * * *